Patented Aug. 2, 1932  1,870,203

UNITED STATES PATENT OFFICE

CURT RÄTH, OF OPLADEN, GERMANY, ASSIGNOR TO THE FIRM SCHERING-KAHLBAUM A. G., OF BERLIN, GERMANY

COMPOUNDS OF THE PYRIDINE SERIES

No Drawing.   Application filed March 26, 1930.   Serial No. 439,221.

My invention refers to new chemical products of therapeutical value and more especially to compounds of the pyridine series containing the OH group in 2-position and halogens in 3 or 5- or in 3 and 5-position.

These compounds which correspond to the general formula:

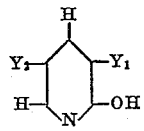

in which at least one of the two Y may be a halogen, while the other is a halogen or hydrogen, dissolve in water only with difficulty.

By treating these compounds with carboxalkylating agents, they are converted into compounds having the general formula:

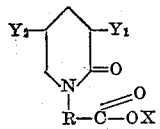

wherein at least one of the two Y is a halogen, while the other may be a halogen or hydrogen and R—COOX a carboxalkyl group, the typical hydrogen atom X of which may also be replaced by an alkali forming metal.

Example 1

17,4 grams 2-oxy-5-bromopyridine are dissolved in 130 ccms. of a 10% caustic soda solution. To this solution is added a solution of 18,8 grams monochloro acetic acid in 20 ccms. water and the mixture is heated to boiling point for five hours. After the solution has cooled down, dilute sulfuric acid is added, the precipitating compound is filtered by suction and dissolved in cold dilute sodium carbonate solution. After filtration to remove the undissolved parts the filtrate is once more precipitated with dilute sulfuric acid. By recrystallization from water 2-oxo-5-bromopyridine-N-acetic acid is obtained forming white coarse crystals melting at 237–238° C. With alkalis the acid forms readily soluble salts. The sodium salt has the formula:

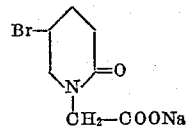

Example 2

12,7 grams 2-oxy-3,5-dibromopyridine are dissolved in 80 ccms. of a 60% caustic soda solution to which is added a solution of 9,4 grams monochloro acetic acid in 20 ccms. water, the mixture being now heated to boiling point for five hours. After cooling dilute sulfuric acid is added to the solution, the precipitate is filtered by suction and dissolved in cold dilute sodium carbonate solution. The undissolved parts are removed by filtration and the filtrate is once more precipitated with dilute sulfuric acid. By recrystallization from water there is obtained 2-oxo-3, 5-bromopyridine-N-acetic acid forming small white needles melting at 240–241° C., this acid forming with alkali readily soluble salts.

The sodium salt has the formula:

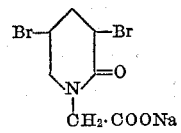

Example 3

11 grams 2-oxy-5-iodopyridine are dissolved in 80 ccms. of a 10% caustic soda solution, to which is added a solution of 9,4 grams monochloro acetic acid in 18 ccms. water, the mixture being heated to boiling point for five hours. After cooling dilute sulfuric acid is added to the solution, the precipitating compound is filtered by suction and dissolved in the cold in dilute soda solution. After removing the undissolved parts by filtration the filtrate is once more precipitated with dilute sulfuric acid. The 2-oxo-5-iodopyridine-N-acetic acid is recrystallized from water in the presence of some animal charcoal. The product thus obtained takes on a brown color at 235° C. and is decomposed at 230° C. With alkalis the acid forms readily soluble salts. The sodium salt has the formula:

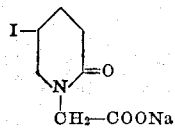

Example 4

8,7 grams 2-oxy-3,5-diiodopyridine are dissolved in 80 ccms. of a 5% caustic soda solution to which is added a solution of 4,7 grams monochloro acetic acid in 10 ccms. water, the mixture being heated to boiling point for five hours. After cooling dilute sulfuric acid is added to the solution, the precipitate is filtered by suction and dissolved in the cold in dilute soda solution. The undissolved parts are removed by filtration and the filtrate is precipitated once more with dilute sulfuric acid. The 2-oxo-3,5-diiodopyridine-N-acetic acid is recrystallized from a great quantity of water in the presence of animal charcoal. The product takes on a brown color at 237° C. and is decomposed at 244° C. With alkalis the acid forms readily soluble salts. The sodium salt has the formula:

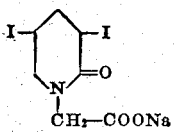

Example 5

30 grams 2-oxy-3-bromo-5-iodo pyridine are dissolved in 200 ccms. of a 10% caustic soda solution, to which is added a solution of 18,8 grams monochloro acetic acid in 20 ccms. water, the mixture being then heated to boiling point for five hours. After cooling dilute sulfuric acid is added to the solution, the precipitate is filtered by suction and dissolved in cold dilute soda solution. After removal of the undissolved parts by filtration the filtrate is precipiated once more with dilute sulfuric acid. By recrystallization from water 2-oxo-3-bromo-5-iodo pyridine-N-acetic acid is recovered in the form of small white needles which sinter at 237° C. and melt at 244-245° C. With alkalis the acid forms readily soluble salts. The sodium salt has the formula:

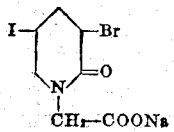

The increase of solubility of the derivatives, obtained according to the method above described, of the halogen derivatives used as starting materials is shown by the following comparative figures:

While the 2-oxy-5-iodo pyridine dissolves in water only in a concentration of 0,4:100, its sodium salt in a concentration of 4:100, the sodium salt of 2-oxy-5-iodo pyridine-N-acetic acid (Example 3) dissolves in water in the proportion of 25:100. The free 2-oxy-5-iodo pyridine-N-acetic acid also shows a tenfold solubility in water as compared with 2-oxy-5-iodo pyridine. The solubility of the compounds described in the other examples is also increased at least ten times as compared with the starting material.

The new compounds are very valuable as contrast agents in the X-ray examination of the uropoetical system.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. As new products N-carboxalkylated halogen pyridones having the general formula:

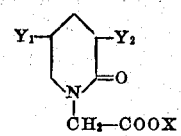

is which $Y_1$ and $Y_2$ are hydrogen or halogen atoms, at least one being a halogen atom, and X the typical hydrogen atom which may also be replaced by an alkali forming metal, these compounds being well crystallized colorless substances which dissolve in cold water with difficulty and in hot water more readily and form alkali salts which are very readily soluble in water.

2. As new products N-carboxalkylated halogen pyridones having the general formula:

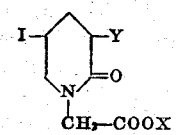

wherein Y is hydrogen or a halogen atom and X the typical hydrogen atom which may also be replaced by an alkali forming metal, these compounds being well crystallized colorless substances which dissolve in cold water with difficulty and in hot water more readily and form alkali salts which are very readily soluble in water.

3. As a new product 2-oxo-5-iodo pyridine-N-acetic acid having the formula:
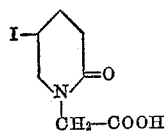
which dissolves with some difficulty in cold water and more readily in hot water and forms very readily soluble alkali salts.
4. As a new product the sodium salt of 2-oxo-5-iodo-pyridine-N-acetic acid having the formula:
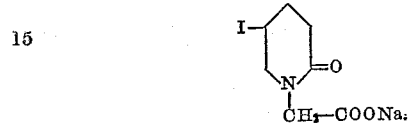
In testimony whereof, I affix my signature.
CURT RÄTH.